US011686380B2

(12) United States Patent
Cao et al.

(10) Patent No.: US 11,686,380 B2
(45) Date of Patent: Jun. 27, 2023

(54) DIFFERENTIAL SYSTEM

(71) Applicant: Jing-Jin Electric Technologies Co., Ltd., Beijing (CN)

(72) Inventors: Yang Cao, Beijing (CN); Ping Yu, Beijing (CN); Jianwen Li, Beijing (CN); Guoshan Liu, Beijing (CN); Fei Wang, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/851,088

(22) Filed: Jun. 28, 2022

(65) Prior Publication Data

US 2023/0143681 A1 May 11, 2023

(30) Foreign Application Priority Data

Nov. 11, 2021 (CN) ........................ 202111354019.2

(51) Int. Cl.
*F16H 48/24* (2006.01)
*F16H 48/08* (2006.01)
(Continued)

(52) U.S. Cl.
CPC ............ *F16H 48/24* (2013.01); *F16D 27/118* (2013.01); *F16H 48/08* (2013.01); *F16H 2048/346* (2013.01)

(58) Field of Classification Search
CPC ............... F16H 48/24; F16H 2048/346; F16H 48/08–2048/087; F16D 27/118
See application file for complete search history.

(56) References Cited

U.S. PATENT DOCUMENTS 8,535,194 B2 * 9/2013 Juenemann .......... B60K 17/348 475/249
10,012,300 B2 * 7/2018 Valente .................. F16H 48/24
(Continued)

FOREIGN PATENT DOCUMENTS

DE 10 2013 109 835 A1 3/2015
WO 2018232262 A1 12/2018

OTHER PUBLICATIONS

Office Action (Communication) dated Nov. 24, 2022, by the European Patent Office in corresponding European Patent Application No. 22182286.9. (4 pages).

*Primary Examiner* — Ernesto A Suarez
*Assistant Examiner* — James J Taylor, II
(74) *Attorney, Agent, or Firm* — Buchanan Ingersoll & Rooney PC

(57) ABSTRACT

A differential system includes a differential and a differential disconnect mechanism. The differential includes an outer differential housing and an inner differential housing. The differential disconnect mechanism includes a disconnect clutch, first end face teeth and second end face teeth. The first end face teeth are disposed between the outer differential housing and the inner differential housing and are movably connected with the outer differential housing so that the first end face teeth can move axially and rotate synchronously relative to the outer differential housing. The second end face teeth are fixedly connected with the inner differential housing. The disconnect clutch is connected with the first end face teeth, and is configured to drive the first end face teeth to move axially relative to the second end face teeth.

10 Claims, 2 Drawing Sheets

1 1-1 1-2 40 20 21 3 4 17 10 23 20 21 5 6 11 19 14 13 12 19 50 29 9 7 8 2 16

(51) Int. Cl.

| | |
|---|---|
| ***F16H 48/34*** | (2012.01) |
| ***F16D 27/118*** | (2006.01) |

(56) References Cited

U.S. PATENT DOCUMENTS

| | | | | |
|---|---|---|---|---|
| 11,098,794 | B2 * | 8/2021 | Yudell | F16H 48/22 |
| 11,390,160 | B2 * | 7/2022 | McBride | B60K 17/3515 |
| 2001/0044355 | A1 | 11/2001 | Cheadle et al. | |
| 2008/0146353 | A1 * | 6/2008 | Boffelli | H02K 49/108 464/29 |
| 2018/0051786 | A1 * | 2/2018 | Krishnan | B60K 17/3462 |
| 2022/0389997 | A1 * | 12/2022 | Lee | F16H 48/08 |

* cited by examiner

DIFFERENTIAL SYSTEM

TECHNICAL FIELD

The present disclosure belongs to the technical field of differential, in particular relates to a differential system.

BACKGROUND

The automobile differential can make the left and right (or front and rear) driving wheels rotate at different speeds. Its function is to make the left and right wheels roll at different speeds when the automobile turns or rides on rough roads, that is, to ensure the pure rolling movement of the driving wheels on both sides.

The power of the differential may need to be disengaged or engaged when the vehicle is riding in different and complex road conditions. For example, when the vehicle switches between four-wheel drive and two-wheel drive, the power of the front/rear differential needs to be disengaged or engaged. However, in the existing vehicles, the disengagement or engagement of differential power is mostly achieved by friction; the friction differential power system has a low torque transmission efficiency and is large in volume, and is not convenient to be arranged in the vehicle.

SUMMARY

In view of the above problems, the present disclosure discloses a differential system to overcome the above problems or at least partially solve the above problems.

In order to achieve the above object, the present disclosure adopts the following technical solutions:

The present disclosure provides a differential system, comprising a differential and a differential disconnect mechanism;

the differential comprises an outer differential housing and an inner differential housing, and the outer differential housing is used for transmission connection with an upper stage transmission structure of the differential;

the differential disconnect mechanism comprises a disconnect clutch, first end face teeth and second end face teeth, the first end face teeth are disposed between the outer differential housing and the inner differential housing and are movably connected with the outer differential housing so that the first end face teeth can move axially and rotates synchronously relative to the outer differential housing, and the second end face teeth are fixedly connected with the inner differential housing;

the disconnect clutch is connected with the first end face teeth, and is configured to drive the first end face teeth to move axially relative to the second end face teeth, and control the first end face teeth and the second end face teeth to engage or disengage.

Further, the differential disconnect mechanism further comprises a movable plate sleeve and a connection pin;

the movable plate sleeve is sleeved on the outer differential housing in a clearance fit, the movable plate sleeve is fixedly connected with the disconnect clutch, one end of the connection pin passes through a through hole on the outer differential housing and is fixedly connected with the first end face teeth, the other end of the connection pin is fixedly connected with the movable plate sleeve, the disconnect clutch drives the first end face teeth to move axially by means of the movable plate sleeve and the connection pin.

Further, a movable part of the disconnect clutch is sleeved on the movable plate sleeve, a bearing is provided between the movable part of the disconnect clutch and the movable plate sleeve, and a fixed part of the disconnect clutch is fixedly connected with an external structure.

Further, an outer circumference of the first end face teeth is provided thereon with a first external spline, and an inner wall of the outer differential housing is provided thereon with a first internal spline to be engaged with the first external spline; the first external spline is engaged with the first internal spline, and the first end teeth are movable axially relative to the outer differential housing.

Further, the differential system further comprises a differential locking mechanism;

the differential disconnect mechanism is sleeved on a first output half shaft disposed on one side of the differential, and the differential locking mechanism is sleeved on a second output half shaft disposed on the other side of the differential;

the differential locking mechanism comprises a locking clutch, third end face teeth and fourth end face teeth; the third end face teeth are sleeved on the second output half shaft and are movable axially only, the fourth end face teeth are fixedly connected with the outer differential housing or the inner differential housing, the locking clutch is sleeved on the second output half shaft and is configured to drive the third end face teeth to move axially and engage with the fourth end face teeth through the third end face teeth and lock the second output half shaft with the outer differential housing or the inner differential housing, thereby realizing the same speed of the first output half shaft and the second output half shaft.

Further, the movable part of the locking clutch is sleeved on the third end face teeth, a bearing is provided between the movable part of the locking clutch and the third end face teeth, and the fixed part of the locking clutch is fixedly connected with the external structure.

Further, the second output half shaft is provided thereon with a second external spline, and the third end face teeth are provided thereon with a second internal spline that cooperate with the second external spline; the second external spline is engaged with the second internal spline, and the third end face teeth are movable axially relative to the second output half shaft.

Further, the outer differential housing and the inner differential housing are supported and positioned by a bearing or a lubrication ring;

the outer differential housing is fixedly connected with the external structure through a bearing.

Further, the differential further comprises four planetary gears and a pin carrier;

the pin carrier is disposed at the top of the four planetary gears and is configured to limit positions of the planetary gears.

Further, both the disconnect clutch and the locking clutch are a self-holding electromagnetic clutch, the self-holding electromagnetic clutch uses an elastic part or a magnet to self-hold, and does not need to be powered on when maintaining a disengagement state and an engagement state.

The advantages and beneficial effects of the present disclosure are as follows.

In the differential system of the present disclosure, the outer differential housing is used for transmission connection with an upper stage transmission structure of the differential, and the first end face teeth are driven by the disconnect clutch to separate from or engage with the second end face teeth, so as to realize the disconnection or connection of power transmission between the outer differential housing and the inner differential housing. The differential system can quickly disengage or engage the power of the differential, and has the advantages of high torque transmission efficiency, long service life, compact structure, and being convenient to be arranged in the vehicle and so on.

BRIEF DESCRIPTION OF DRAWINGS

By reading the detailed description of the preferred embodiments below, various other advantages and benefits will become clear to a person of ordinary skill in the art. The drawings are only used for the purpose of illustrating the preferred embodiments, and should not be considered as a limitation to the present disclosure. Moreover, throughout the drawings, the same reference numerals are used to denote the same components. In the drawings.

Figure 1:
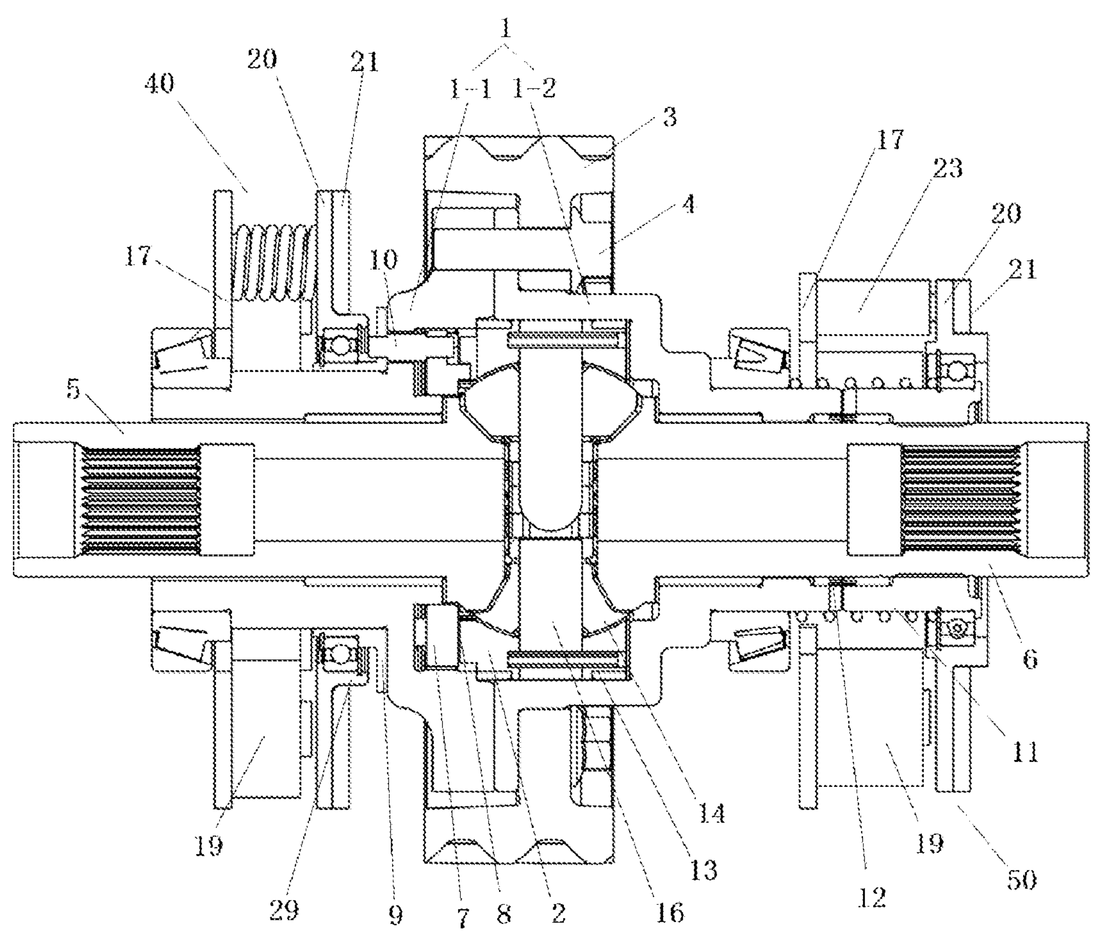
FIG. 1 is an axial sectional diagram of a differential system according to a first embodiment of the present disclosure.

In the drawings: 1, outer differential housing; 1-1, front outer differential housing; 1-2, rear outer differential housing; 2, inner differential housing; 3, transmission gear; 4, fixing bolt; 5, first output half shaft; 6, second output half shaft; 7, first end face teeth; 8, second end face teeth; 9, movable plate sleeve; 10, connection pin; 11, third end face teeth; 12, fourth end face teeth; 13, lubrication ring; 14, planetary gear; 15, pin carrier; 16, short pin shaft; 17, yoke; 18, iron core; 19, electromagnetic coil; 20, moving carrier disc; 21, magnetic conductive disc; 22, magnet; 23, guide pin; 24, guide hole; 25, position-limiting flange; 26, induction coil; 27, induction block; 28, magnetic isolation sleeve; 29, positioning flange; 30, magnet groove; 40, disconnect clutch; 50, locking clutch.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the embodiments described herein are only part of the embodiments of the present disclosure, rather than all of the embodiments. Based on the embodiments in the present disclosure, all other embodiments obtained by a person of ordinary skill in the art without paying creative work shall fall within the protection scope of the present disclosure.

The technical solutions according to various embodiments of the present disclosure will be described in detail below in conjunction with the accompanying drawings.

First Embodiment

In the present embodiment, a differential system is provided, which comprises a differential and a differential disconnect mechanism.

Figure 2:
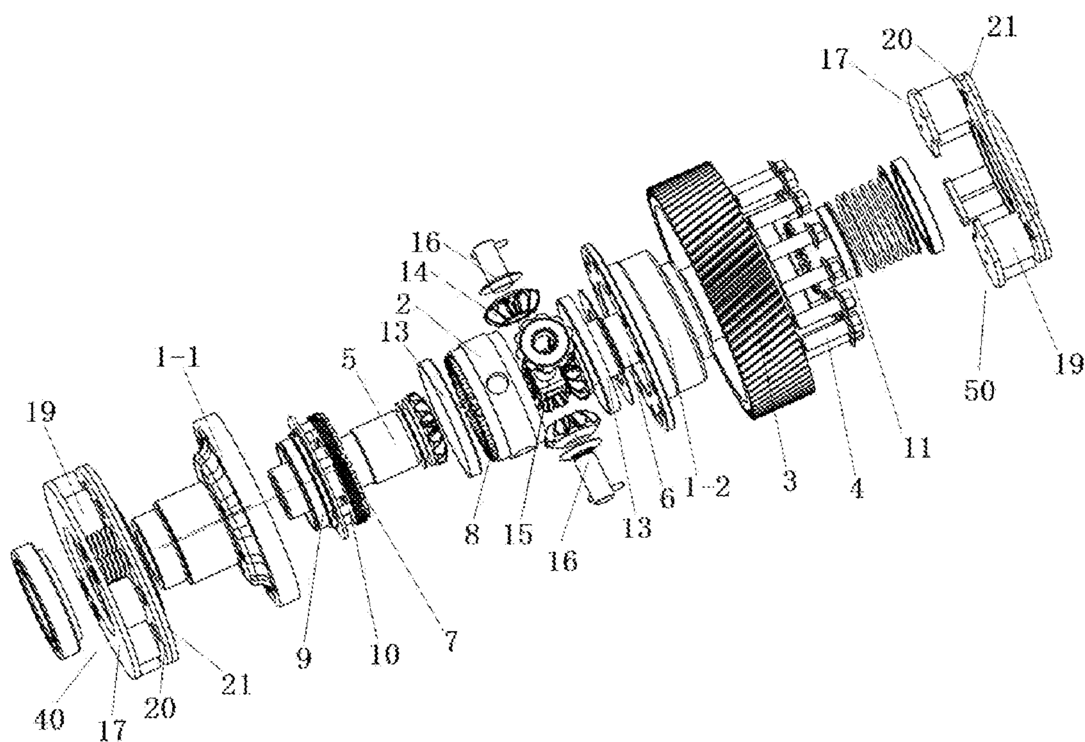
FIG. 2 is an exploded structural diagram of the differential system according to the first embodiment of the present disclosure.

As shown in FIGS. 1 and 2, the differential comprises an outer differential housing 1 and an inner differential housing 2. The inner differential housing 2 is disposed in the outer differential housing 1, and the outer differential housing 1 can rotate relative to the inner differential housing 2. In order to facilitate the assembly of the outer differential housing 1 and inner differential housing 2, the outer differential housing 1 adopts a two-piece structure which consists of a front outer differential housing 1-1 and a rear outer differential housing 1-2. The front outer differential housing 1-1 and the rear outer differential housing 1-2 are fixedly connected along the axial direction, for example, through bolts.

In addition, the outer differential housing is fixedly connected with an external structure through a bearing to limit the position of the outer differential housing, and the outer differential housing can rotate relative to the external structure. The external structure may be a gearbox housing or a gearbox box.

The outer differential housing 1 is in transmission connection with an upper stage transmission structure of the differential. Through the upper stage transmission structure of the differential, the power of the vehicle power system is transmitted to the differential. The outer differential housing 1 of the present embodiment is fixed with a transmission gear 3, and the transmission gear 3 is in transmission connection with the upper stage transmission structure of the differential, so as to transmit power by means of the transmission gear 3.

Further, the transmission gear 3 is fixed on the outer differential housing 1 through fixing bolts 4. In order to simplify the structure of the differential, the fixing connection of the front outer differential housing 1-1, the rear outer differential housing 1-2 and the transmission gear 3 can be realized through the fixing bolts 4. In other embodiments, the transmission gear 3 can be integrally cast with the outer differential housing 1, or the transmission gear 3 can be fixed on the outer differential housing 1 in other structural forms, such as flange connection.

The two sides of the differential are connected respectively with the first output half shaft 5 and the second output half shaft 6. One end of the first output half shaft 5 passes through the outer differential housing 1 to form a transmission connection with the inner differential housing 2, and the other end of the first output half shaft 5 is connected with a wheel of the vehicle. One end of the second output half shaft 6 passes through the outer differential housing 1 to form a transmission connection with the inner differential housing 2, and the other end of the second output half shaft 6 is connected with a wheel of the vehicle. The differential transmits power to the wheels through the first output half shaft 5 and the second output half shaft 6.

Specifically, as shown in FIGS. 1 and 2, the differential disconnect mechanism is sleeved on the first output half shaft 5. The differential disconnect mechanism comprises a disconnect clutch 40, first end face teeth 7 and second end face teeth 8. The first end face teeth 7 are disposed between the outer differential housing 1 and the inner differential housing 2 and are movably connected with the outer differential housing 1, so that the first end face teeth 7 can move axially and rotate synchronously relative to the outer differential housing 1. The second end face teeth 8 are fixedly connected with the inner differential housing 2. The second end face teeth 8 of the present embodiment are integrally cast with the inner differential housing 2. Of course, in other embodiments, the second end face teeth 8 can be fixed on the inner differential housing 2 by bolts or screws.

The disconnect clutch 40 is sleeved on the first output half shaft 5 and connected with the first end face teeth 7, and is configured to drive the first end face teeth 7 to move axially relative to the second end face teeth 8 and control the first end face teeth 7 and the second end face teeth 8 to engage or disengage.

The working principle of the differential system of the present embodiment is as follows. When the disconnect clutch drives the first end face teeth to engage with the second end face teeth, the outer differential housing and the inner differential housing are in transmission connection, the outer differential housing transmits power to the inner differential housing to drive the differential to rotate, and the differential further transmits power to the first output half shaft and the second output half shaft. At this point, the vehicle power system provides power to the wheels. When the disconnect clutch drives the first end face teeth to separate from the second end face teeth, there is no transmission connection between the outer differential housing and the inner differential housing. The outer differential housing does not transmit power to the inner differential housing, and the power of the differential is cut off. At this point, the vehicle power system does not provide power to the wheels.

In sum, in the differential system of the present embodiment, the outer differential housing is used for transmission connection with an upper stage transmission structure of the differential, and the first end face teeth are driven by the disconnect clutch to separate from or engage with the second end face teeth, so as to realize the disconnection or connection of power transmission between the outer differential housing and the inner differential housing. The differential system can quickly disengage or engage the power of the differential, and has the advantages of high torque transmission efficiency, long service life, compact structure, and being convenient to be arranged in the vehicle and so on.

In the present embodiment, as shown in FIGS. 1 and 2, the differential disconnect mechanism also comprises a movable plate sleeve 9 and a connection pin 10.

Specifically, the outer differential housing 1 extends to both sides, the movable plate sleeve 9 is sleeved on the front outer differential housing 1-1 in a clearance fit, and the movable plate sleeve 9 is fixedly connected with the disconnect clutch 40. One end of the connection pin 10 passes through the through hole on the front outer differential housing 1-1 and is fixedly connected with the first end face teeth 7, and the other end of the connection pin 10 is fixedly connected with the movable plate sleeve 9. The through hole and the connection pin 10 are assembled together by a clearance fit, so as to enable the connection pin 10 to move axially in the through hole, and further define the movable plate sleeve 9 to move axially relative to the outer differential housing 1. In this way, the disconnect clutch 40 drives the first end face teeth 7 to move axially by means of the movable plate sleeve 9 and the connection pin 10, and then controls the first end face teeth 7 and the second end face teeth 8 to engage or disengage. The number and position of connection pin 10 can be adjusted according to the design needs.

Further, as shown in FIG. 1, the movable part of the disconnect clutch 40 is sleeved on the movable plate sleeve 9, and a bearing is provided between the movable part of the disconnect clutch 40 and the movable plate sleeve 9 to enable relative rotation between the movable plate sleeve 9 and the disconnect clutch 40. The fixed part of the disconnect clutch 40 is fixedly connected with the external structure, and the movable part of the disconnect clutch 40 can move axially relative to the fixed part of the disconnect clutch 40. The axial movement of the first end face teeth 7 is realized through the disengagement and engagement of the disconnect clutch 40. The external structure may be a gearbox housing or a gearbox box.

In the present embodiment, in order to realize the axial movement and synchronous rotation of the first end face teeth relative to the outer differential housing, an outer circumference of the first end face teeth is provided with a first external spline, and an inner wall of the outer differential housing is provided with a first internal spline to be engaged with the first external spline. The first external spline is engaged with the first internal spline in a clearance fit, so that the first end face teeth can only move axially relative to the outer differential housing without other relative movement. When the first end face teeth are engaged with the second end face teeth, the torque transmission between the outer differential housing and the inner differential housing is realized through the first external spline and the first internal spline.

In the present embodiment, in order to make the differential have a locking function and realize the rotation of the first output half shaft and the second output half shaft at the same speed, the differential system also comprises a differential locking mechanism.

Specifically, as shown in FIG. 1, the differential locking mechanism is sleeved on the second output half shaft 6. The differential locking mechanism comprises a locking clutch 50, third end face teeth 11 and fourth end face teeth 12. The third end face teeth 11 are sleeved on the second output half shaft 6 and can move axially only, and the fourth end face teeth 12 are fixedly connected with the rear outer differential housing 1-2. In the present embodiment, the fourth end face teeth 12 are integrally cast with the rear outer differential housing 1-2. Of course, in other embodiments, the fourth end face teeth 12 may be fixed on the rear outer differential housing 1-2 by bolts or screws. In addition, the locking clutch 50 is also sleeved on the second output half shaft 6 to drive the third end face teeth 11 to move axially. The third end face teeth 11 are engaged with the fourth end face teeth 12, so as to lock the second output half shaft 6 with the outer differential housing 1, and realize the same speed of the first output half shaft 5 and the second output half shaft 6.

When the disconnect clutch drives the first end face teeth to engage with the second end face teeth, the differential transmits the power to the first output half shaft and the second output half shaft. When the locking clutch drives the third end face teeth to separate from the fourth end face teeth, the first output half shaft and the second output half shaft can realize the output of the same output torque and different speeds, and thus two wheels rotate at different speeds. The first output half shaft, the second output half shaft and the outer differential housing rotate at the same speed, and the differential loses its differential function, when the locking clutch drives the third end face teeth to engage with the fourth end face teeth. For example, when one driving wheel slips, the first output half shaft and the second output half shaft rotate at the same speed, which can transmit all the torque to the other driving wheel, so that the car can get enough driving power to get out of trouble.

When the disconnect clutch drives the first end face teeth to separate from the second end face teeth, the transmission connection between the outer differential housing and the inner differential housing is cut off, and the differential cannot transmit power to the first output half shaft and the second output half shaft. However, when the locking clutch drives the third end face teeth to engage with the fourth end face teeth, the power of the outer differential housing can be transmitted to the second output half shaft through the fourth end face teeth and the third end face teeth, and only the second output half shaft is driven to rotate. At this point, all torque is transmitted to the driving wheel corresponding to the second output half shaft, and the first output half shaft and the second output half shaft can rotate at different speeds, that is, the two wheels can be in differential rotation. For example, when the driving wheel corresponding to the first output half shaft slips and cannot provide a driving force, only the second output half shaft can be driven to rotate to get the vehicle out of trouble. At this point, the first output half shaft and the second output half shaft can rotate at different speeds, which reduces the sliding friction between the driving wheel corresponding to the first output half shaft and the ground, thereby reducing tire wear and power consumption.

As shown in FIG. 1, the movable part of the locking clutch 50 is sleeved on the third end face teeth 11, and a bearing is provided between the movable part of the locking clutch 50 and the third end face teeth 11, so that the third end face teeth 11 can rotate relative to the movable part of the locking clutch 50. Since the movable part of the locking clutch 50 can move axially relative to the fixed part of the disconnect clutch 40, the axial movement of the third end face teeth 11 is realized through the disengagement and engagement of the disconnect clutch 40. The fixed part of the locking clutch 50 is fixedly connected with the external structure. The external structure may be a gearbox housing or a gearbox box.

In the present embodiment, in order to realize that the third end face teeth can only move axially on the second output half shaft, the second output half shaft is provided thereon with a second external spline, and the third end face teeth are provided thereon with a second internal spline to be engaged with the second external spline. The second external spline and the second internal spline are engaged in a clearance fit, so that the third end face teeth can only move axially relative to the second output half shaft without other relative movement. When the third end face teeth are engaged with the fourth end face teeth, the torque transmission between the outer differential housing and the second output half shaft is realized through the second external spline and the second internal spline.

In the present embodiment, as shown in FIGS. 1 and 2, a lubrication ring 13 is provided between the outer differential housing 1 and the inner differential housing 2. The support and positioning of the two are realized through the lubrication ring 13, so as to realize the relative rotation of the outer differential housing 1 and the inner differential housing 2.

In the present embodiment, as shown in FIGS. 1 and 2, the differential also comprises four planetary gears 14 and a pin carrier 15. Among them, two planetary gears 14 are respectively sleeved on two ends of the same long pin shaft, and the other two planetary gears 14 are respectively sleeved on two short pin shafts 16.

Specifically, the pin carrier 15 is disposed at the top of the four planetary gears 14, the long pin shaft passes through the pin carrier 15, and the pin carrier 15 is configured to limit the positions of the planetary gears 14 to make the differential structure more stable. Moreover, through the design of four planetary gears 14, the bearing strength of the differential is increased and the service life of the differential is prolonged.

In the present embodiment, both the disconnect clutch and the locking clutch are a bistable electromagnetic clutch. The bistable electromagnetic clutch comprises a fixed part, a movable part and an elastic part. The fixed part maintains a fixed position in the axial direction of the electromagnetic clutch, and the movable part can move along the axial direction of the electromagnetic clutch, so that the electromagnetic clutch can switch between the engaged position and the disengaged position.

Figure 3:
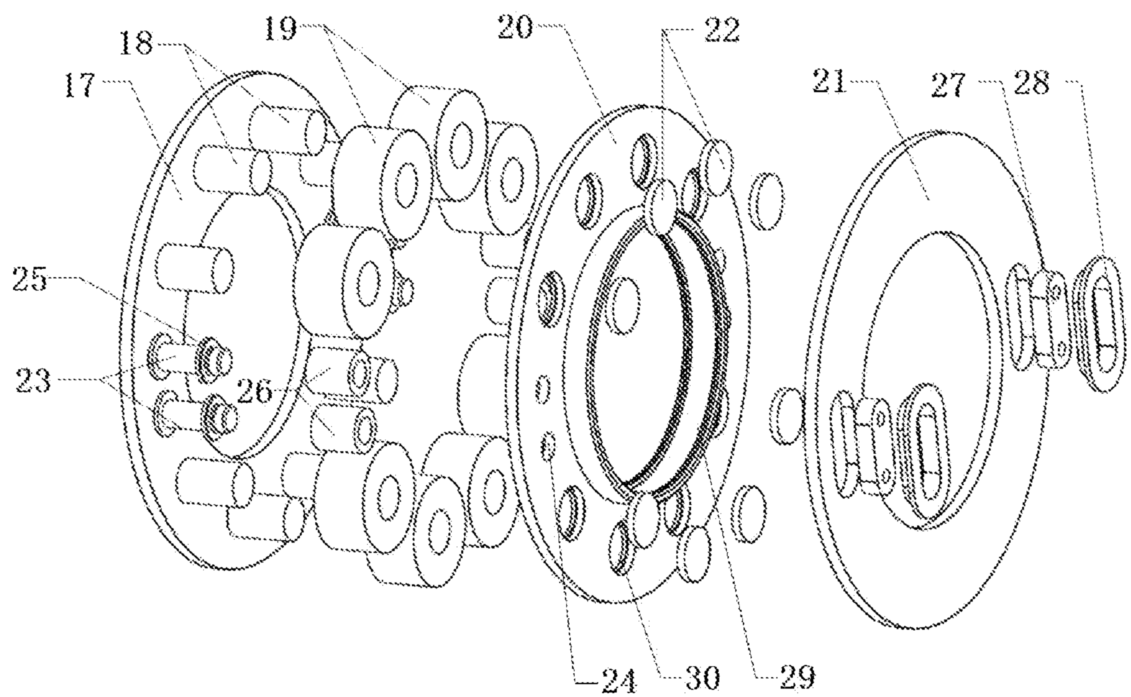
FIG. 3 is an exploded structural diagram of a bistable electromagnetic clutch according to the first embodiment of the present disclosure.

Specifically, as shown in FIGS. 1 to 3, the fixed part comprises a yoke 17, an iron core 18 and an electromagnetic coil 19. A plurality of iron cores 18 are provided on the same side of the yoke 17 along the circumferential direction of the yoke 17. A plurality of electromagnetic coils 19 are respectively sleeved on the plurality of iron cores 18. An electromagnetic force can be generated when the electromagnetic coil 19 is energized.

The movable part comprises an moving carrier disc 20 and a magnetic conductive disc 21. The magnetic conductive disc 21 is fixed on a side of the moving carrier disc 20 that is away from the yoke 17. The yoke 17, the moving carrier disc 20 and the magnetic conductive disc 21 form a correspondence relationship along the axial direction of the electromagnetic clutch. The moving carrier disc 20 is provided thereon with a plurality of magnet 22, and the axes of the plurality of magnet 22 are respectively in the same line with the axes of the plurality of iron cores 18, so as to facilitate the accurate engagement between the iron cores 2 and the magnet 22.

In the present embodiment, eight iron cores and eight magnet are provided according to the sizes of the yoke and moving carrier disc to ensure the engagement stability between the yoke and moving carrier disc. In other embodiments, the number and position of iron cores and magnet may be adjusted according to different design requirements. In addition, in the present embodiment, the yoke and magnetic conductive disc are designed to have an integral structure, that is, a circular ring structure. Of course, the yoke and/or magnetic conductive disc may also be designed to have other shapes than circular ring according to the different use environment.

The elastic part is configured to adjust the positional relationship between the moving carrier disc 20 and the yoke 17. In the present embodiment, the elastic part is disposed between the moving carrier disc 20 and the yoke 17, and the elastic part is preloaded in a compressed state, so that the moving carrier disc 20 and the yoke 17 can be maintained in separated positions in a natural state.

In the present embodiment, since the iron core is provided independently, the magnetic induction intensity generated by the electromagnetic coil can be more concentrated and dense relative to the magnet, so as to obtain a higher electric energy conversion rate. At this point, according to the principle that similar poles repel each other while different poles attract each other, much different electromagnetic forces can be generated by controlling the electromagnetic coil to switch between the forward energization and the reverse energization, and then the position relationship between the moving carrier disc and the yoke can be adjusted by cooperating with the elastic part.

When the electromagnetic coil is energized in the forward direction, the electromagnetic force generated by the electromagnetic coil increases the binding force between the iron core and the magnet, so as to drive the moving carrier disc against the preload of the elastic part to move to a position where it is engaged with the yoke.

When the electromagnetic coil is energized in the reverse direction, the electromagnetic force generated by the electromagnetic coil reduces the binding force between the iron core and the magnet, so that the moving carrier disc moves away from the yoke under the preload of the elastic part, so as to push the moving carrier disc to a position where it is separated from the yoke.

Preferably, in the present embodiment, two adjacent electromagnetic coils are set as a group, and the two electromagnetic coils in the same group are wound to form a group of windings with identical magnetic polarities, that is, to form a consequent pole winding, and its corresponding two magnet are configured to form a group of magnetomotive forces with identical magnetic polarities. At this point, the two electromagnetic coils in the same group form a U-shaped magnetic circuit with the yoke after being energized, and then form a closed annular magnetic circuit loop through the corresponding magnet and magnetic conductive disc, which can effectively avoid the occurrence of magnetic flux leakage, improve the electromagnetic utilization rate, and improve the utilization rate of magnet and electromagnetic coil.

The working principle of the bistable electromagnetic clutch in the present embodiment is as follows.

When the electromagnetic coil is in the non-energized state, the electromagnetic coil does not generate an electromagnetic force on the iron core, and the preload of the elastic part is greater than the natural binding force between the iron core and the magnet, so that the moving carrier disc and the yoke are in the natural separation positions under the preload of the elastic part, that is, a large air gap is maintained between the moving carrier disc and the yoke.

When the electromagnetic coil is energized in the forward direction, the electromagnetic coil generates a forward electromagnetic force on the iron core, so that the binding force between the iron core and the magnet is increased to be greater than the preload of the elastic part, so as to move the moving carrier disc to a position where it is engaged with the yoke, that is, a small air gap is formed between the moving carrier disc and the yoke. At this point, if the electromagnetic coil is powered off, and the electromagnetic force generated by the electromagnetic coil is eliminated, the binding force formed between the iron core and the magnet will still remain to be greater than the preload of the elastic part, so that the moving carrier disc is kept in the position where it is engaged with the yoke, and the electromagnetic coil is in a state of no power consumption.

When the electromagnetic coil is energized in the reverse direction, the electromagnetic coil generates a reverse electromagnetic force on the iron core, so that the binding force between the iron core and the magnet is reduced to be less than the preload of the elastic part, so as to move the moving carrier disc to a position where it is separated from the yoke under the preload of the elastic part, that is, a larger air gap is formed between the moving carrier disc and the yoke.

In sum, the bistable electromagnetic clutch of the present embodiment does not need to be powered on or consume any other form of energy both in the disengaged state and in the engaged state, and thus has the advantages of no energy consumption, no heat generation and long service life; it effectively avoids the risk of sudden disconnection of the clutch due to power failure, and thus improves the safety and reliability of the whole system. Moreover, in the bistable electromagnetic clutch of the present embodiment, two adjacent electromagnetic coils are set as a group, the two electromagnetic coils in the same group are wound to form a group of windings with identical magnetic polarities, and the corresponding two magnet form a group of magnetomotive forces with identical magnetic polarities, so that the two electromagnetic coils in the same group form a closed magnetic circuit loop, which can effectively avoid the phenomenon of magnetic leakage, improve the utilization rate of magnet and electromagnetic coil, and achieve the lightweight and compact design of electromagnetic clutch.

In the present embodiment, as shown in FIGS. 1 to 3, the yoke 17 is further provided thereon with a guide pin 23, and the moving carrier disc 20 is provided thereon with a guide hole 24 corresponding to the guide pin 23 along the axial direction. At this point, when the moving carrier disc 20 and the yoke 17 are disposed correspondingly in the axial direction, the end of the guide pin 23 is just inserted into the guide hole 24, and the guide pin 23 can move axially in the guide hole 24. At this point, through the cooperation between the guide pin 23 and the guide hole 24, the moving carrier disc 20 and the yoke 17 can move axially only and cannot rotate relative to each other, so as to ensure that the positions of the electromagnetic coil 19 and the magnet 22 maintain a one-to-one correspondence relation during the disengagement and engagement of the bistable electromagnetic clutch, and further ensure the accuracy and reliability of the switching between the disengagement and engagement of the bistable electromagnetic clutch.

Further, as shown in FIG. 3, a position-limiting flange 25 is further provided on the guide pin 23. The position-limiting flange 25 is disposed on an outer circumference of the guide pin 23, and its outer diameter is larger than the diameter of the guide hole 24. At this point, when the bistable electromagnetic clutch is in the engaged state, the guide pin 23 extends into the guide hole 24, and the position-limiting flange 25 forms direct contact with the moving carrier disc 20, so as to maintain the engaged position between the iron core 18 and the magnet 22. In this way, the gap distance between the positioning iron core 18 and the magnet 22 can be formed by the direct contact between the position-limiting flange 25 and the moving carrier disc 20, and the wear caused by the direct contact between the iron core 18 and the magnet 22 for a long time can be avoided, thereby improving the protection of the iron core 18 and the magnet 22 and prolonging the service life of the bistable electromagnetic clutch.

In the present embodiment, the guide pin is made of a ferromagnetic material. As shown in FIG. 3, the guide pin 23 is provided thereon with an induction coil 26; moreover, the two induction coils 10 wound on the two adjacent guide pins 23 are set as a group, and the two induction coils 10 in the same group are wound to form a group of windings with identical magnetic polarities.

At this point, the two guide pins in the same group pass through the guide holes and form axial air gaps with the induction block provided on the magnetic conductive disc, that is, the two guide pins in the same group correspond to the same induction block. When the bistable electromagnetic clutch is in a disengaged position, the air gap between the guide pin and the induction block is large; when the bistable electromagnetic clutch is in an engaged position, the air gap between the guide pin and the induction block is small.

The axial air gap between the guide pin and the induction block affects the induction coefficient of the induction coil, that is, when the size of the axial air gap is different the current signal output by the corresponding induction coil is different. Therefore, an input current signal is applied to the induction coil, and then the air gap between the guide pin and the induction block is determined according to the current signal output by the induction coil, and then the position of the moving carrier disc relative to the yoke is judged, that is, the state of the bistable electromagnetic clutch is judged.

In the present embodiment, the induction coil and the induction block are designed based on the structure of the bistable electromagnetic clutch, which can realize the monitoring of the state of the electromagnetic clutch without increasing the volume of the electromagnetic clutch and affecting the symmetry of the electromagnetic clutch, and thus has the advantages of high integration degree, simple structure and low manufacturing costs.

In addition, in the present embodiment, since the position-limiting flange is provided on the guide pin, the axial position of the induction coil wound on the guide pin is limited by the position-limiting flange, which can prevent the induction coil from moving axially.

In addition, as shown in FIG. 3, a magnetic isolation sleeve 28 is further provided between the magnetic conductive disc 21 and the induction block 27. The magnetic isolation sleeve 12 plays the role of shielding the magnetic circuit on the magnetic conductive disc 21, so that the inductive magnetic circuit generated by the induction coil 26 and the electromagnetic magnetic circuit generated by the electromagnetic coil 19 are independent of each other and do not interfere with each other. The magnetic isolation sleeve 28 is preferably a magnetic isolation aluminum sleeve.

In the present embodiment, the elastic part of the disconnect clutch is a compression spring and is sleeved on the guide pin. Specifically, the spring is sleeved on the outside of the induction coil, and one end of the spring is directly connected fixedly with the yoke. By selecting the spring as the elastic part, the space volume inside the bistable electromagnetic clutch can be fully utilized to make its structure more compact. The elastic part of the locking clutch is also a compression spring. The spring is coaxial with the yoke and moving carrier disc. One end of the spring is connected with the moving carrier disc and the other end is connected with the yoke.

In the present embodiment, as shown in FIG. 1 and FIG. 3, a positioning flange 29 is further provided on the side of the moving carrier disc 20 that is close to the magnetic conductive disc 21, and the magnetic conductive disc 21 is sleeved on the positioning flange 29, so as to realize the positioning connection between the magnetic conductive disc 21 and the moving carrier disc 20, and ensure that the magnetic conductive disc 21 and the moving carrier disc 20 are on the same axial straight line.

As shown in FIG. 3, the moving carrier disc 20 of the present embodiment is provided thereon with magnet grooves 30, and the magnet 22 are fixed in the magnet grooves 30. Specifically, the magnet are fixed in the magnet grooves by glue filling or injection molding, so as to reduce the thickness and size of the moving carrier disc, further reduce the size of the whole clutch and achieve miniaturization design.

In addition, according to different design requirements, the top surface of the magnet may have different shapes, such as rectangle, square, triangle or circle.

In addition, in the present embodiment, the electromagnetic coils can be connected in any of the following ways: parallel, series, group series, group parallel or hybrid connection. In other words, the electromagnetic coils may be connected in series or in group series; or the electromagnetic coils may be connected in parallel or in group parallel; or the electromagnetic coils may be connected in hybrid connection such as series parallel connection, for example, multiple electromagnetic coils are selected to be connected in series as a group, and then several groups of electromagnetic coils that have been connected in series are further connected in parallel.

Second Embodiment

The present embodiment differs from the first embodiment in that both the disconnect clutch and the locking clutch are a self-holding electromagnetic clutch. Regarding the structure and function of the electromagnetic self-holding clutch, please refer to the self-holding electromagnetic clutch in Chinese patent application No. 202110480211.X titled "Locking Structure of a Differential". The self-holding electromagnetic clutch uses an elastic part or a magnet to self-hold. It does not need to be powered on when maintaining the disengagement state or the engagement state, and has the advantages of low energy consumption, low heat generation and long service life.

Third Embodiment

The present embodiment differs from the first embodiment in that the fourth end face teeth are fixedly connected with the inner differential housing, and the locking clutch drives the third end face teeth to engage with the fourth end face teeth to lock the second output half shaft with the inner differential housing, thereby realizing the same rotation speed of the inner differential housing, the first output half shaft and the second output half shaft.

In the present embodiment, only when the disconnect clutch drives the first end face teeth to engage with the second end face teeth, the first output half shaft and the second output half shaft can obtain the driving force. That is, the power of the differential can be completely cut off by means of the disconnect clutch, which improves the controllability of the differential system.

Fourth Embodiment

The present embodiment differs from the first embodiment in that the outer differential housing and the inner differential housing are supported and positioned by a bearing.

The above only describes the specific embodiments of the present disclosure. Under the above teaching of the present disclosure, a person skilled in the art can make other improvements or modifications on the basis of the above embodiment. A person skilled in the art should understand that the above specific description is only for better explaining the purpose of the present disclosure, and the protection scope of the present disclosure should be subject to the protection scope of the claims.

What is claimed is:

1. A differential system, comprising a differential and a differential disconnect mechanism, and further comprising a differential locking mechanism;

wherein the differential disconnect mechanism is sleeved on a first output half shaft disposed on one side of the differential, the differential locking mechanism is sleeved on a second output half shaft disposed on the other side of the differential, and the two sides of the differential are connected respectively with the first output half shaft and the second output half shaft;

the differential comprises an outer differential housing and an inner differential housing, the inner differential housing is disposed in the outer differential housing, and the outer differential housing rotates relative to the inner differential housing;

the differential disconnect mechanism comprises a disconnect clutch, first end face teeth and second end face teeth, the first end face teeth are disposed between the outer differential housing and the inner differential housing and are movably connected with the outer differential housing, and the second end face teeth are fixedly connected with the inner differential housing;

the disconnect clutch is connected with the first end face teeth, drives the first end face teeth to move axially and rotates synchronously with the outer differential housing, and further drives the first end face teeth to move axially relative to the second end face teeth, so as to control the first end face teeth and the second end face teeth to engage or disengage, and realize the disconnection or connection of power transmission between the outer differential housing and the inner differential housing;

the differential locking mechanism comprises a locking clutch, third end face teeth and fourth end face teeth; the third end face teeth are sleeved on the second output half shaft and are movable axially only; the fourth end face teeth are fixedly connected with the outer differential housing; the locking clutch is sleeved on the second output half shaft, drives the third end face teeth to move axially, and further controls the third end face teeth and the fourth end face teeth to engage so that the second output half shaft is locked with the outer differential housing, thereby realizing a same rotation speed of the first output half shaft and the second output half shaft;

both the disconnect clutch and the locking clutch are a bistable electromagnetic clutch, which comprises a fixed part, a movable part and an elastic part; the fixed part maintains a fixed position in an axial direction of the electromagnetic clutch; the movable part moves along the axial direction of the electromagnetic clutch, so that the electromagnetic clutch switches between an engaged position and a disengaged position; the elastic part is disposed between the fixed part and the movable part and is preloaded in a compressed state, and controls the fixed part and the movable part to maintain in separated positions in a natural state.

2. The differential system according to claim 1, wherein the differential disconnect mechanism further comprises a movable plate sleeve and a connection pin;

the movable plate sleeve is sleeved on the outer differential housing in a clearance fit, the movable plate sleeve is fixedly connected with the disconnect clutch, one end of the connection pin passes through a through hole on the outer differential housing and is fixedly connected with the first end face teeth, the other end of the connection pin is fixedly connected with the movable plate sleeve, the disconnect clutch drives the first end face teeth to move axially by means of the movable plate sleeve and the connection pin.

3. The differential system according to claim 2, wherein the movable part of the disconnect clutch is sleeved on the movable plate sleeve, a bearing is provided between the movable part of the disconnect clutch and the movable plate sleeve, and the fixed part of the disconnect clutch is fixedly connected with an external structure.

4. The differential system according to claim 1, wherein an outer circumference of the first end face teeth is provided thereon with a first external spline, and an inner wall of the outer differential housing is provided thereon with a first internal spline to be engaged with the first external spline; the first external spline is engaged with the first internal spline, and the first end face teeth are movable axially relative to the outer differential housing.

5. The differential system according to claim 1, wherein the movable part of the locking clutch is sleeved on the third end face teeth, a bearing is provided between the movable part of the locking clutch and the third end face teeth, and the fixed part of the locking clutch is fixedly connected with an external structure.

6. The differential system according to claim 1, wherein the second output half shaft is provided thereon with a second external spline, and the third end face teeth are provided thereon with a second internal spline to be engaged with the second external spline; the second external spline is engaged with the second internal spline, and the third end face teeth are movable axially relative to the second output half shaft.

7. The differential system according to claim 1, wherein the outer differential housing and the inner differential housing are supported and positioned by a bearing or a lubrication ring.

8. The differential system according to claim 1, wherein the differential further comprises four planetary gears and a pin carrier;

the pin carrier is disposed at the top of the four planetary gears and limits positions of the planetary gears.

9. The differential system according to claim 1, wherein the fixed part comprises a yoke, a plurality of iron cores and a plurality of electromagnetic coils, the plurality of iron cores are provided on a same side of the yoke along a circumferential direction of the yoke, the plurality of electromagnetic coils are respectively sleeved on the plurality of iron cores, and an electromagnetic force can be generated when the electromagnetic coils are energized;

the movable part comprises an armature disc, a conductive disc and a plurality of magnets; the conductive disc is fixed on a side of the armature disc that is away from the yoke; the yoke, the armature disc and the conductive disc form a correspondence relationship along the axial direction of the electromagnetic clutch; the plurality of magnets are provided on the armature disc; and axes of the plurality of magnets are respectively in the same line with axes of the plurality of iron cores, so as to facilitate accurate engagement between the iron cores and the magnets;

the elastic part is disposed between the armature disc and the yoke, and controls the armature disc and the yoke to maintain in the separated positions in the natural state.

10. The differential system according to claim 9, wherein two adjacent electromagnetic coils are a group, the two electromagnetic coils in a same group are wound to form a group of windings with identical magnetic polarities, and corresponding two magnets form a group of magnetomotive forces with identical magnetic polarities.

* * * * *